(12) United States Patent
Cho et al.

(10) Patent No.: US 6,494,935 B2
(45) Date of Patent: Dec. 17, 2002

(54) VORTEX GENERATOR

(75) Inventors: Young I. Cho, Cherry Hill, NJ (US);
Cheolho Bai, Taegu (KR)

(73) Assignee: Vortex Aircon, Inc., Cherry Hill, NJ (US)

( * ) Notice: Subject to any disclaimer, the term of this patent is extended or adjusted under 35 U.S.C. 154(b) by 14 days.

(21) Appl. No.: 09/737,016

(22) Filed: Dec. 14, 2000

(65) Prior Publication Data

US 2002/0073848 A1 Jun. 20, 2002

(51) Int. Cl.⁷ .............................................. B01D 45/12
(52) U.S. Cl. .............................. 95/271; 55/309; 55/312; 55/396; 55/459.1
(58) Field of Search ........................ 55/312, 309, 394, 55/396, 459.1; 95/271; 96/188, 189; 62/5

(56) References Cited

U.S. PATENT DOCUMENTS

| | | |
|---|---|---|
| 2,698,525 A | 1/1955 | Lindenblad |
| 2,920,457 A | 1/1960 | Bartlett |
| 3,287,924 A | 11/1966 | Bright |
| 4,646,524 A | 3/1987 | Kawashima et al. ............. 62/5 |
| 5,976,227 A * | 11/1999 | Lorey ............................ 55/396 |
| 6,250,086 B1 | 6/2001 | Cho et al. ......................... 62/5 |

FOREIGN PATENT DOCUMENTS

JP           54-7647           1/1979

OTHER PUBLICATIONS

Newman Tools Inc., "Vortex Tubes For Spot Cooling", pp. 1–7.

* cited by examiner

*Primary Examiner*—Robert A. Hopkins
(74) *Attorney, Agent, or Firm*—Mark A. Garzia, P.C.

(57) ABSTRACT

A vortex generator for accepting high-pressure condensible vapor and separating the condensible vapor into a relatively hot stream of vapor and a relatively cool liquid.

The vortex generator includes an inlet at the first end for allowing high pressure vapor to enter, and an outlet at the second end for allowing condensed liquid to exit wherein the outlet communicates with the inlet via a longitudinal chamber. A nozzle located near the inlet having a plurality of equally-spaced tangential inlets along its perimeter for injecting the vapor that is inlet to the vortex generator into the longitudinal chamber as a high-speed vortex vapor stream proximate the longitudinal axis.

17 Claims, 12 Drawing Sheets

Vortex Generator for Condensing Vapor

Fig. 1  Vortex Generator for Condensing Vapor

Fig. 2 Radial Flow Velocity in Vortex Generator

Fig. 3 Pressure and Temperature Distributions in Vortex Generator

Step 1: Vortex flow is produced in a vortex generator.

Step 2: Vapor at core expands and cools, converting to liquid. Volume decreases by a factor of 100, creating vacuum.

Step 3: Liquid is thrown out by the centrifugal force. Vacuum is required for continuous operation of vortex generator.

Fig. 4 Principle of phase-changing vortex generator

Fig. 5 Cascade effect

Fig. 11  Vortex Generator for Condensing Vapor

VORTEX GENERATOR

FIELD OF THE INVENTION

The present invention relates generally to a vortex tube and, in particular, a vortex generator for condensing condensible vapor.

BACKGROUND OF THE INVENTION

Vortex tubes are well known. Typical vortex tubes are designed to operate with non-condensible gas such as air. A typical vortex tube turns compressed air into two air streams, one of relatively hot air and the other of relatively cold air. A common application for current vortex tubes is in air supply lines and other applications that utilize non-condensible gas under a high pressure.

A vortex tube does not have any moving parts. A vortex tube operates by imparting a rotational flow motion to the incoming compressed air stream. Directing compressed air into an elongated channel in a tangential direction does this.

Figure 12A:
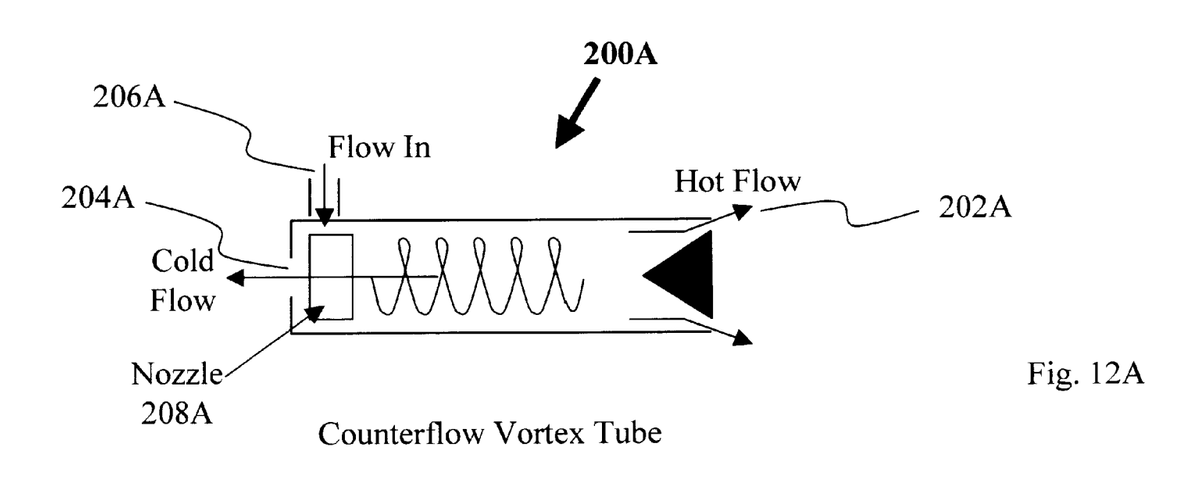
FIGS. 12A and 12B are simplified cross-sectional views of a counter-flow vortex tube and a uniflow vortex tube, respectively, which generally represent the state of the art.
Figure 12B:
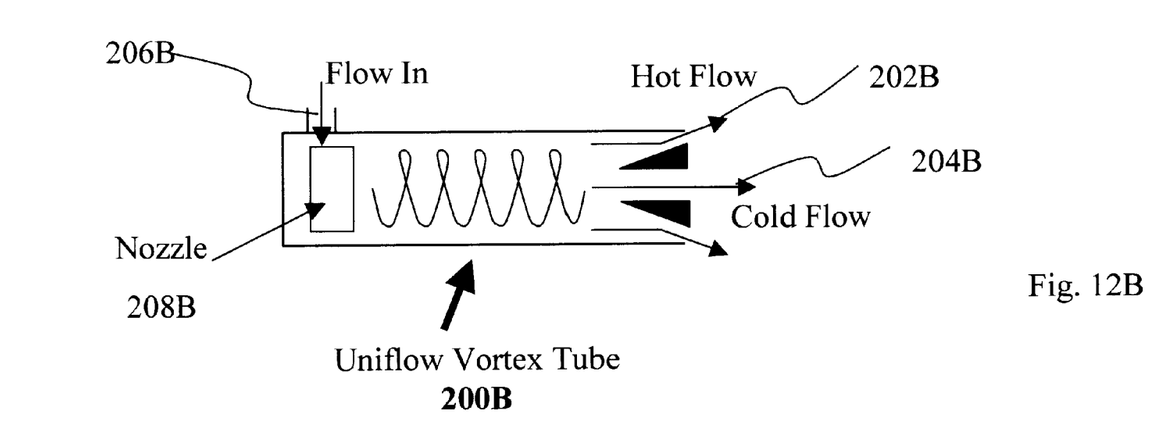

FIGS. 12A and 12B illustrate vortex tubes of two known designs. FIG. 12A illustrates a counterflow vortex tube 200A in which a first outlet 202A is located proximate an inlet 206A, and a second outlet 204A (a substantially peripheral opening) is located at the opposite end.

FIG. 12B illustrates a uniflow vortex tube 200B in which both outlets 202B, 204B are located at the end opposite the inlet 206B. The operating principle of the uniflow vortex tube 200B is similar to the operation of the counterflow vortex tube 200A.

The general flow pattern inside a typical vortex tube 200 is shown. High-pressured or compressed gas enters the vortex tube tangentially at one end at inlet 206 and produces a strong vortex flow in the tube 200. A nozzle 208 is designed to direct the incoming gas in a tangential direction. One stream of gas is produced along the sidewall while a second stream of gas is produced along the longitudinal axis of the vortex tube 200A. Referring to FIG. 12A, the second outlet 204A communicates with the stream of gas that was produced along the outer wall; exiting air is relatively hotter than the compressed air that initially entered the vortex tube 200A. The first outlet 202A communicates with the steam of gas that was produced along the longitudinal axis. The air exiting the first outlet 202A is relatively cooler than the initial compressed air.

As the compressed gas enters the vortex tube 200A at inlet 206A, the velocity of fluid induces a vertical motion which creates a forced vortex at the center of the tube. This flow produces a pressure distribution along the radial direction. The gas proximate the sidewall of the vortex tube 200 is adiabatically compressed, thereby resulting in an increase in temperature. The work to compress the gas is produced by the gas near the longitudinal axis or centerline of the tube 200A, which is adiabatically expanded and cooled.

The cooler gas is confined to the center of the vortex tube substantially along the longitudinal axis and, in fact, creates a second vortex air stream within the initial vortex air stream but traveling in the opposite direction of the initial air stream. The inner vortex air stream of cooler gas leaves the vortex tube 200A along the axial direction of the vortex tube from an outlet 202A located near the first end of the vortex tube 200. The first or peripheral outlet 202A is positioned proximate the second end of the vortex tube 200A. The second or peripheral outlet 204A outlet provides an exit for the relatively hot gas. Accordingly, two separate air streams are produced at the respective outlets and the vortex tube 200A effectively separates a single air stream into a cold air stream and a hot air stream.

The total discharge (hot and cold) volume from a vortex tube is proportional to the absolute inlet pressure. Valves at the inlet (and in alternate embodiments at one or both outlets) control the air flow and, indirectly, the relative temperature gradients of the exiting gases.

SUMMARY OF THE INVENTION

In contrast with currently available vortex tubes, the present invention is referred to as a vortex generator in order to indicate that it is designed to operate on condensible vapor such as steam or a refrigerant vapor for use in a refrigeration apparatus.

The vortex generator of the present invention separates a high-pressure stream of condensible vapor into a relatively hot vapor component and a relatively cool liquid component. In contrast with current vortex tubes, there is no outlet for a cool stream.

BRIEF DESCRIPTION OF THE DRAWINGS

The accompanying drawings, which are incorporated in and form a part of the specification, illustrate the embodiments of the present invention and, together with the description, serve to explain the principles of the invention.

In the drawings.

DETAILED DESCRIPTION OF THE PREFERRED EMBODIMENT

In describing a preferred embodiment of the invention, specific terminology will be selected for the sake of clarity.

However, the invention is not intended to be limited to the specific terms so selected, and it is to be understood that each specific term includes all technical equivalents that operate in a similar manner to accomplish a similar purpose.

The terms "right," "left," "top," "bottom," "lower," and "upper" designate relative directions in the drawings to which reference is made. The terms "inward" and "outward" will usually refer to a direction relative to the longitudinal axis of the vortex generator. The terms "inside" and "outside" will usually refer to a volume or region inside or outside, respectively, of the vortex generator.

The preferred embodiments of the present invention will now be described in detail with reference to the accompanying drawings in which a vortex generator is generally indicated at 10.

Figure 1:
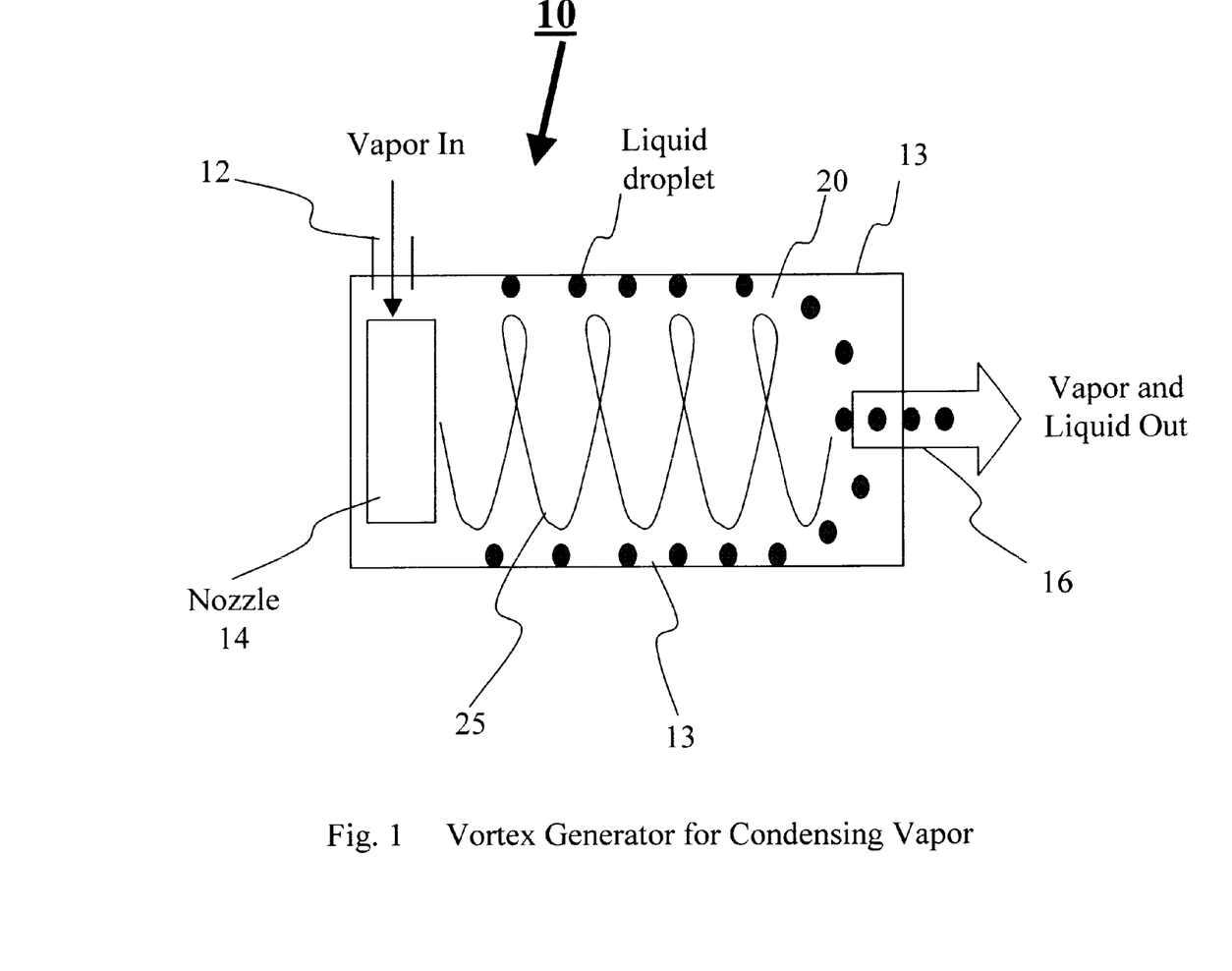
FIG. 1 is a diagrammatic cross-sectional view of a vortex generator in accordance with the present invention.

FIG. 1 is a cross-sectional view of a vortex generator 10 in accordance with the present invention. The vortex generator 10 includes an elongated or longitudinal chamber 20, an inlet 12, a nozzle 14, and an outlet 16. Although the longitudinal chamber 20 is shown as substantially tubular in shape and is defined by sidewall 13, it is believed that other designs (e.g., oval) may be utilized.

Condensible vapor enters the vortex generator 10 at inlet 12. The condensible vapor is under a high pressure. The nozzle 14 is fixed with respect to the sidewall 13 of the longitudinal chamber 20; there are no moving parts in the vortex generator 12. The nozzle 14 is designed to direct the incoming vapor in a tangential direction with respect to the sidewall 13 of the longitudinal chamber 20.

As a result of the injection of vapor in a tangential direction, a vortex-shaped vapor stream 25 is produced within the longitudinal chamber 20. The vortex-shaped vapor stream 25 (sometimes referred to as cyclonic- or spiral-shaped) created by the nozzle 14 is illustrated in FIG. 1. The operation of the nozzle 14 will be more thoroughly discussed in connection with the description of FIGS. 8, 9A and 9B.

Figure 2:
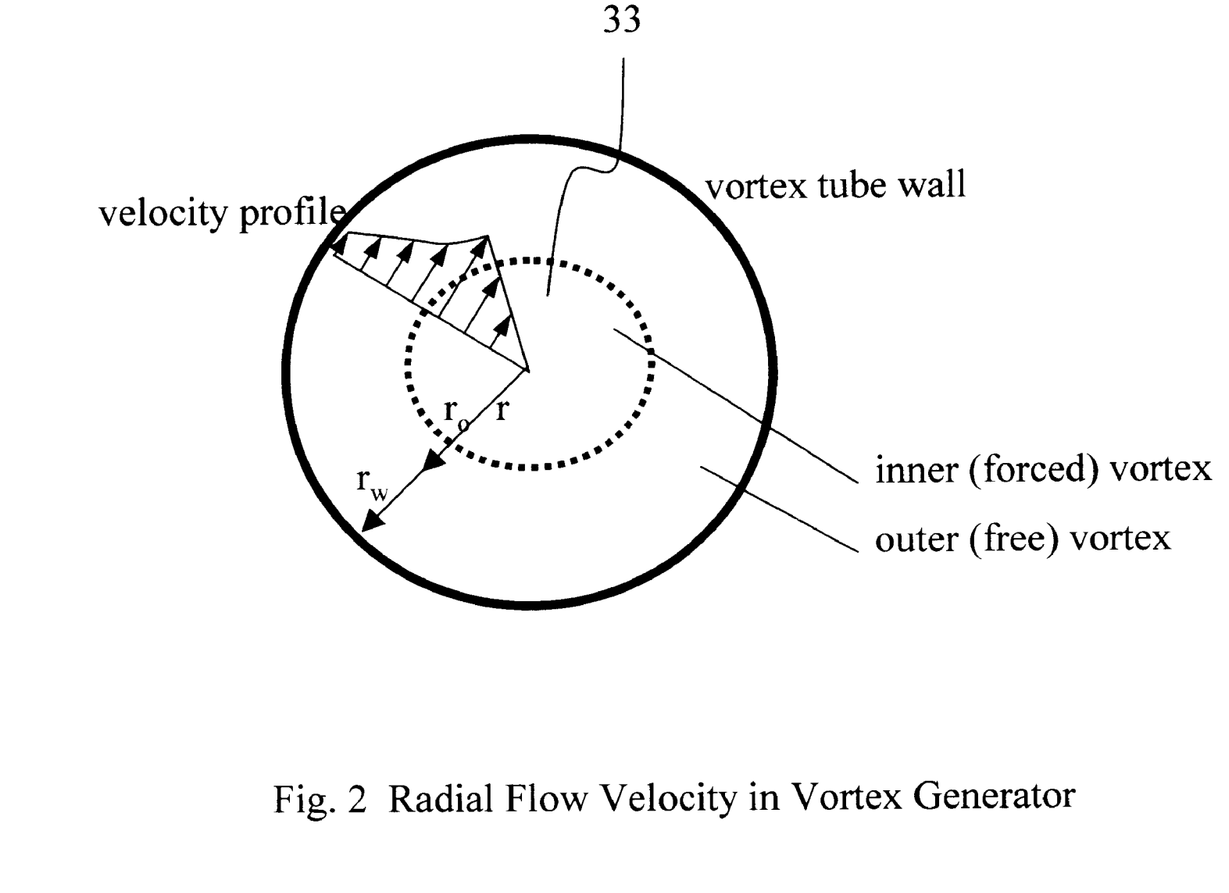
FIG. 2 is a graphical representation of the radial flow velocity taken across the vortex generator of FIG. 1.

Referring now to FIG. 2, near the core region 33 (i.e., parallel to the longitudinal axis) of the elongated chamber, a forced vortex flow is generated, where circumferential velocity linearly increases with the radial distance. Outwards from the core region, there is a free vortex, where circumferential velocity exponentially decreases along the radial distance. As indicated previously, the vortex 25 has the general appearance of a spiral.

As illustrated in FIG. 2, the highest velocity of the vortex 25 occurs at $r_o$. In a typical embodiment, the maximum flow velocity at $r_o$ reaches approximately 100 m/s.

Figure 3A:
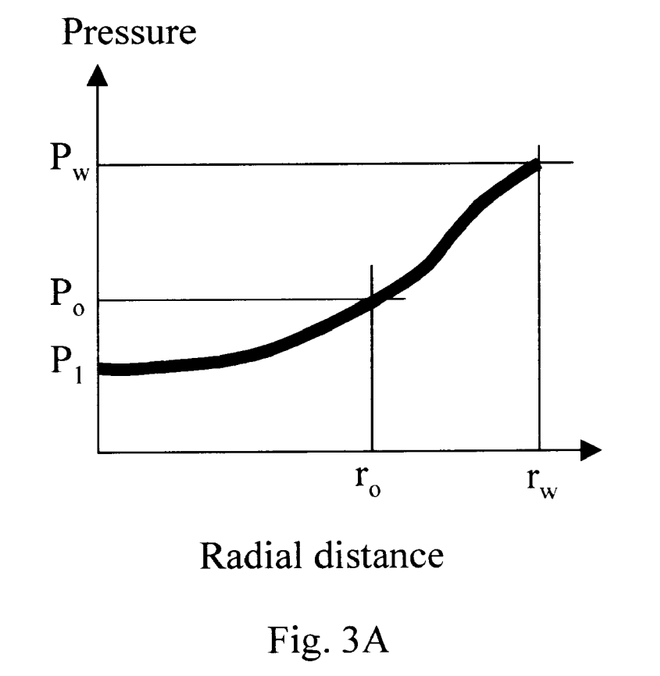
FIGS. 3A and 3B are graphical representations of the pressure and temperature distributions, respectively, with respect to radial distance in the vortex generator.
Figure 3B:
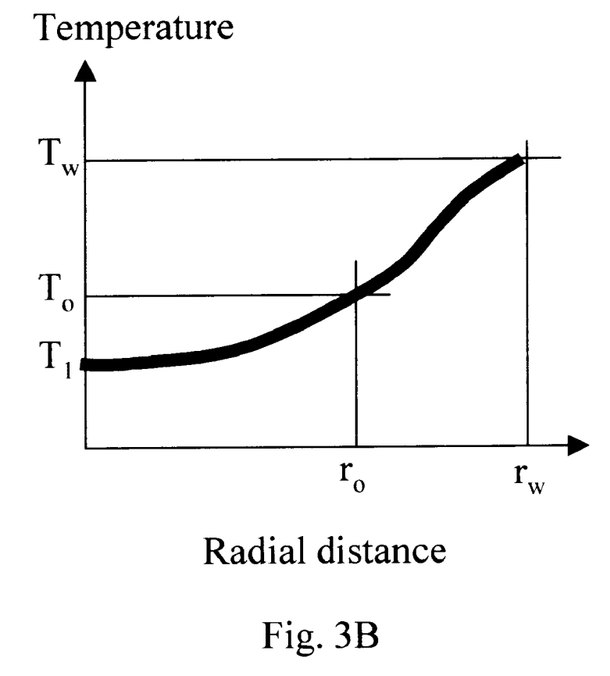

Referring now to FIGS. 3A and 3B, the distributions of both pressure and temperature inside a vortex generator 10 along the radial coordinate are graphically illustrated. The vapor at the core expands due to the centrifugal force, thus reducing its temperature. In comparison, the vapor at the outer region is compressed as the vapor is pushed toward the sidewall by the centrifugal force, thus resulting in an increased temperature.

As condensible vapor enters a vortex generator 10, the vapor at the core of the vortex generator 10 expands due to the vortex flow motion of the vapor, resulting in a localized drop in pressure. Subsequently, its temperature also drops, converting the condensible vapor to liquid (phase change). (Initially, relatively small droplets of liquid are formed.) As the phase change of the condensible vapor occurs, the volume of the condensible vapor shrinks because the volume of liquid is significantly smaller than that of vapor. For example, the volume of liquid water is about 1,000 times smaller than that of water vapor (i.e., steam). For typical refrigerants, such as R-22 and R-134a, the volume of the liquid is approximately 80–100 times smaller than that of the vapor.

As a result of the vapor-liquid conversion, the volume of the condensible vapor decreases, prompting a significant drop in the local pressure. This sudden drop in pressure is essentially the same as what happens when the vapor suddenly expands. The sudden drop in the pressure accompanies a corresponding temperature drop, causing additional condensation around the initial condensed droplet. As a result, the condensible vapor is separated into a relatively cool liquid 38 and relatively hot vapor 39 as shown in FIG. 4.

Figure 4A:
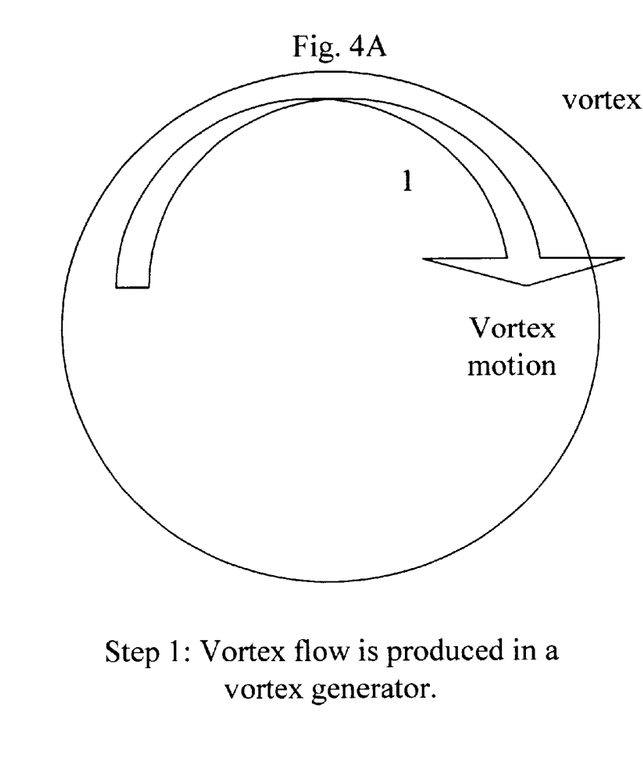
FIGS. 4A and 4B are diagrammatic representations illustrating the principle of phase-changing of the vapor inside the vortex generator of the present invention.
Figure 4B:
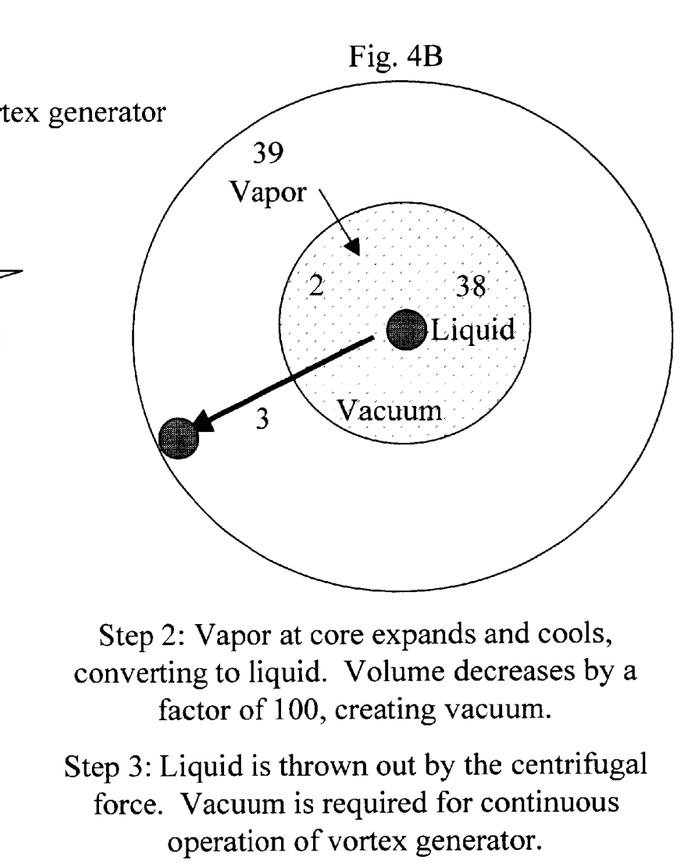

FIGS. 4A and 4B summarize the operating principle of a vortex generator 10. The condensation of condensible vapor inside a vortex generator 10 may be summarized in three steps. Step One, as illustrated in FIG. 4A, shows the vortex flow created by a nozzle 14 at the inlet of a vortex generator 10. Step Two, as illustrated in FIG. 4B, shows the vapor-to-liquid phase change and the creation of a vacuum in the core region; Step Three, also illustrated in FIG. 4B, shows the movement of a liquid droplet from the core to the sidewall of the vortex generator, which is the result of centrifugal force. For continuous phase-change of condensible vapor into a liquid in a vortex generator, it is essential to maintain proper vacuum strength. For example, if the vacuum is too strong, the vortex flow motion will be destroyed as the core vacuum pulls the vapor from the perimeter of the vortex generator to the core. This issue will be discussed further herein.

Figure 5:
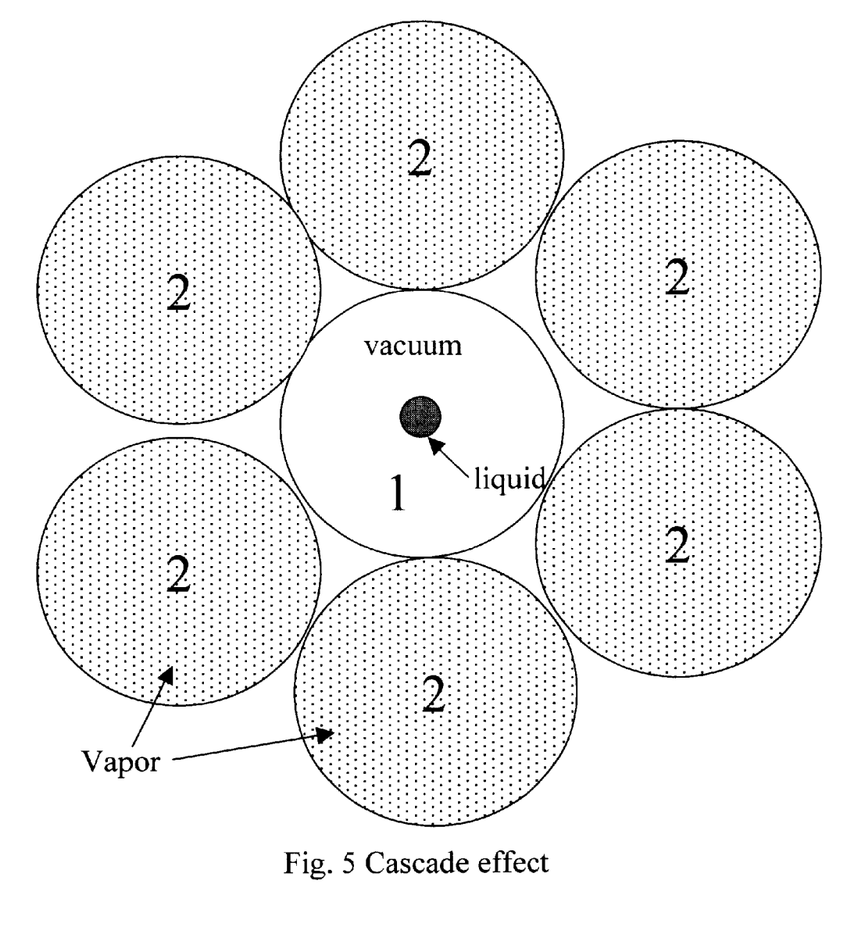
FIG. 5 is a representation of the cascade effect produced inside of a vortex generator in accordance with the present invention.

Liquid production as a result of a cascade effect inside a vortex generator will now be described. Referring now to FIG. 5, the portion of a condensible vapor is represented by region 1, having a temperature that reaches (or drops below) its saturation temperature due to the vortex motion near the inlet of the vortex generator. The vapor converts to liquid in region 1, causing the pressure in the adjacent area (indicated by 2) to drop, prompting a temperature drop and subsequent vapor-liquid conversion. Subsequently, the pressure in region 2 suddenly drops, and the vapor around region 2 is affected by the vacuum, prompting further vapor-liquid conversion. This cascade effect accelerates vapor-liquid conversion in the vortex generator.

The cascade effect is self-sustaining once the first liquid droplet is produced due to the vortex flow motion. In other words, if the vortex motion cannot be maintained, then cold and hot vapor become mixed, and the cascade effect of self-sustaining vapor-liquid conversion stops. In summary, one has to maintain the vortex flow structure to sustain this cascade process.

When the vacuum is too strong, the core of the vacuum pulls vapor in from the perimeter, thus destroying the vortex flow. This happens if the pressure drop is larger than an optimum value which will be discussed herein, in association with FIG. 7. Therefore, the pressure drop across a vortex generator should be small enough to prevent the core vacuum from destroying the vortex flow inside the vortex generator.

Figure 6:
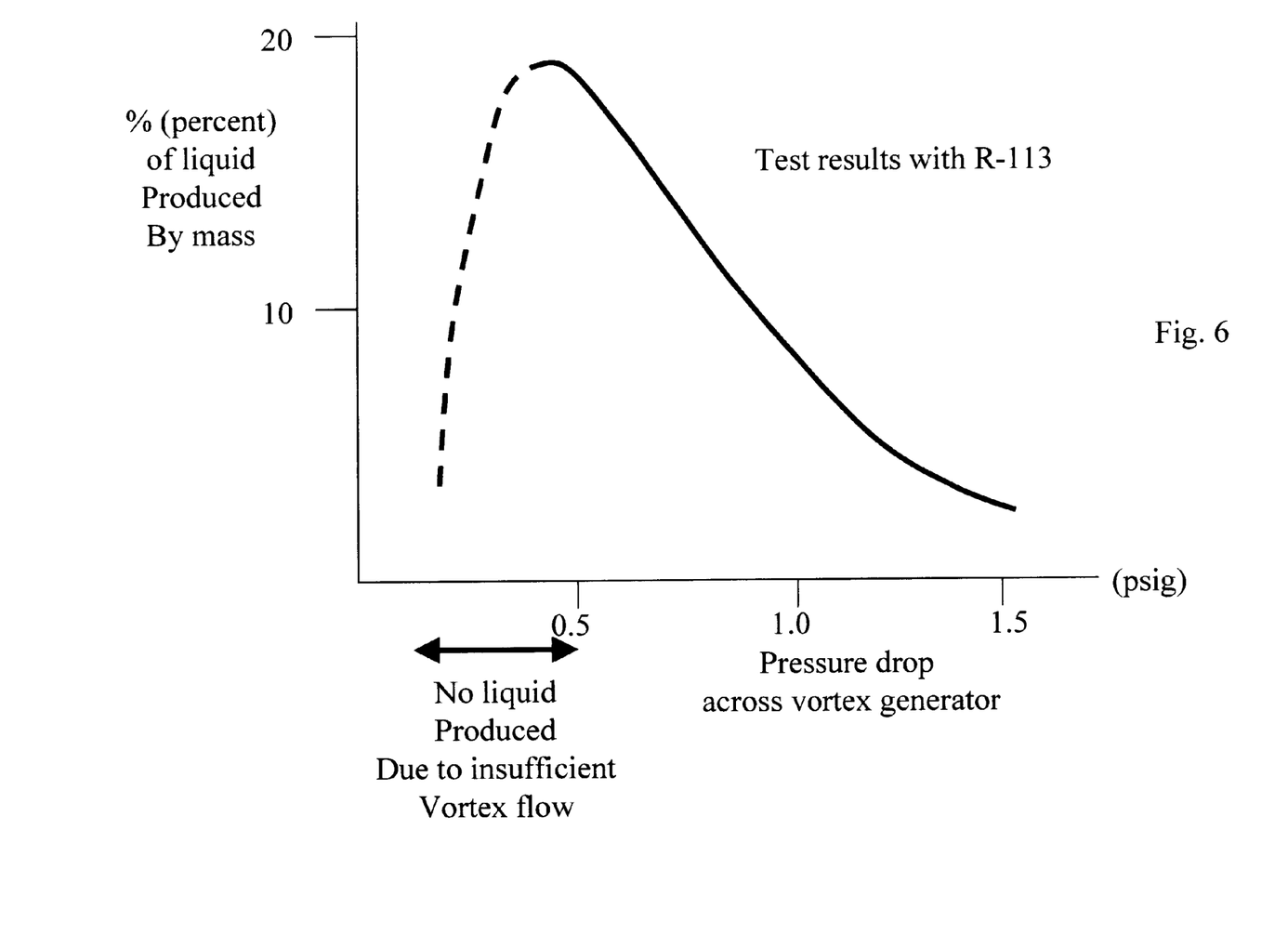
FIG. 6 is a graphical representation of the liquid produced by mass with respect to pressure across the subject vortex generator.

Referring now to FIG. 6, test results of the percentage (%) of liquid produced versus pressure drop with R-113 refrigerant in a vortex generator of inside diameter of approximately ⅜ inches are graphically illustrated. As the pressure drop decreased from 1.5 to 0.5 psig, the percentage of liquid produced increased from 7 to 20%. These test results confirm the aforementioned statement on the effect of core vacuum on the continuous phase-change operation of a vortex generator for condensible vapor. Below 0.5 psig, the production of liquid suddenly drops, which can be attributed to insufficient energy to initiate a vortex flow inside a vortex generator. In other words, below 0.5 psig, an adequate vortex flow could not be created inside the vortex generator. Above 0.5 psig, the process of vapor-liquid conversion becomes less effective as the core vacuum becomes so strong that it begins to destroy the vortex flow motion. Hence, the optimum pressure drop for this particular test was 0.5 psig.

It is well known that conventional vortex tubes perform better as the inlet pressure or the pressure drop across the vortex tube increases. Indeed, conventional vortex tubes (both counterflow and uniflow types) can separate compressed air into cold and hot air streams most efficiently with a large inlet pressure or a large pressure drop across the vortex tube. In contrast, as demonstrated in FIG. 6, a phase-changing vortex generator does not perform efficiently if the inlet pressure is large because larger pressure drops result in stronger vacuums at the core, which destroy the vortex flow structure. Hence, a phase-changing vortex generator needs a small pressure drop, i.e., just small enough to initiate and sustain vortex flow motion inside the vortex generator.

Figure 8:
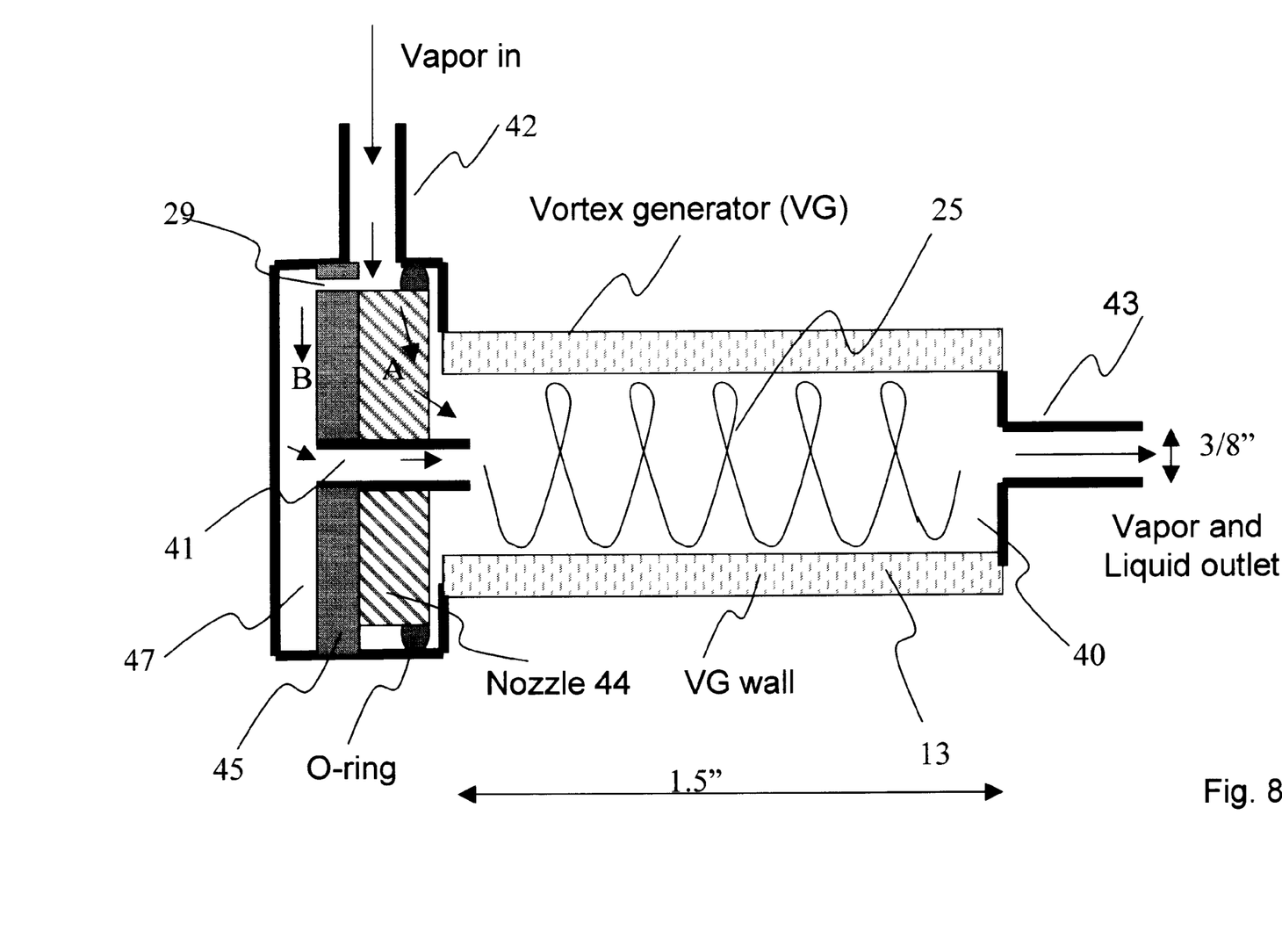
FIG. 8 is a cross-sectional view of an alternate embodiment of a vortex generator that utilizes a central feed in the nozzle.

Referring still to FIG. 6, the effects of a pressure drop across the vortex generator are shown. At zero pressure drop, of course there is no flow and no vortex motion. With decreasing pressure drop, the vortex generator performs better until it suddenly stops functioning because the vortex flow motion cannot be created at a very small pressure drop. The optimal value of the pressure drop depends on the properties of the refrigerant (or water) vapor and the dimensions of the vortex generator. The dimensions given in FIG. 8 are optimized for a vortex generator circulating R-113.

Figure 7:
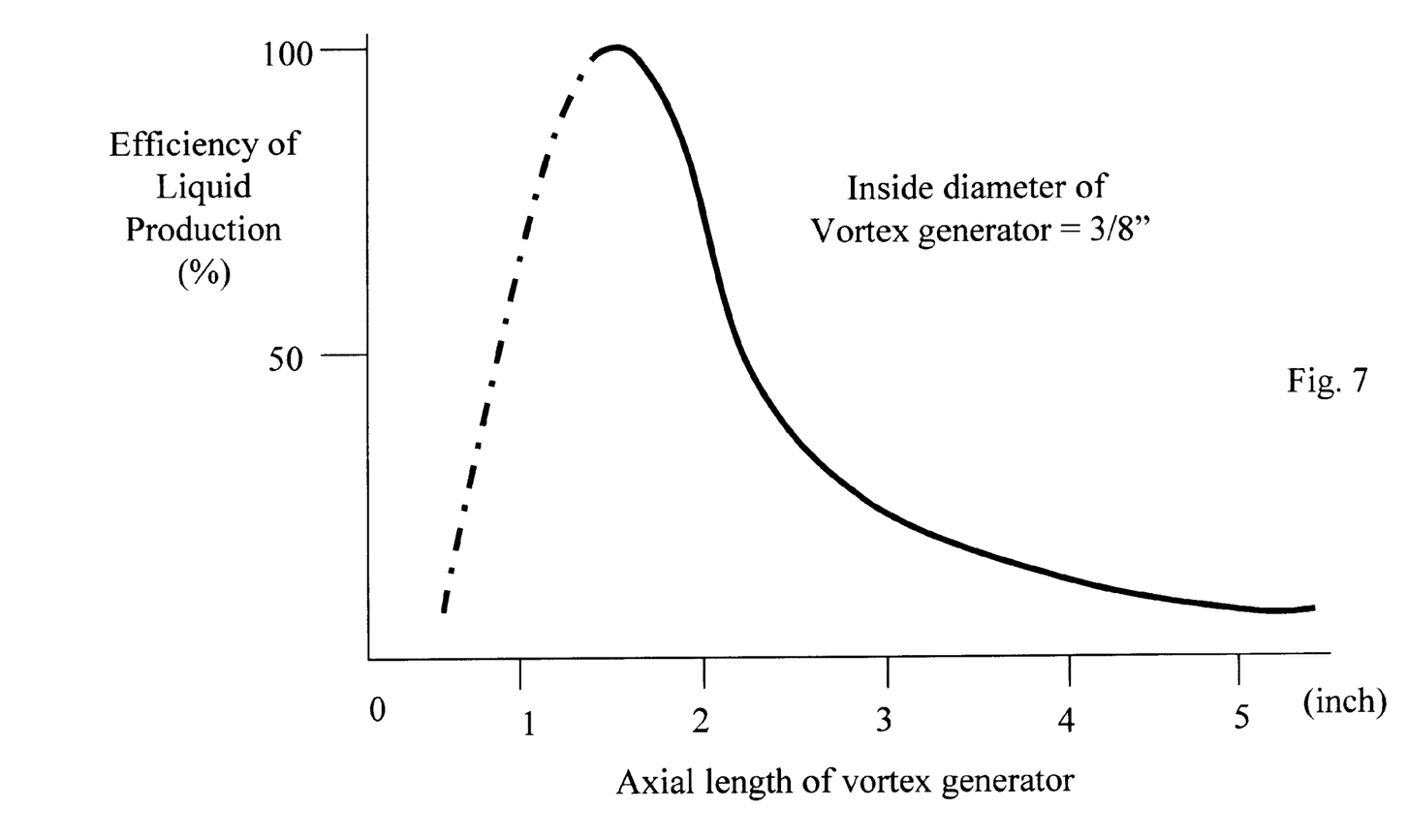
FIG. 7 is a graphical representation of the efficiency of liquid production with respect to axial length of a subject vortex generator.

When the elongated chamber 20 of the vortex generator is too long, liquid can re-evaporate inside. As illustrated in the graph of FIG. 7, test results illustrate the effects of the length of a vortex generator on the performance of a vortex generator using R-113 refrigerant. As shown in FIG. 7, as the length of the vortex generator increased from 1.5 inches to 5 inches, the efficiency of liquid production in the vortex generator decreased from 100% to approximately 10%.

The test results illustrated in FIG. 7 indicate that for a vortex generator circulating R-113 with an inside diameter of approximately ⅜ inches, the optimal length is about 1.5 inches. When the vortex generator is longer than the optimal value, liquid may re-evaporate inside the vortex generator, thereby reducing the efficiency of liquid production as shown in FIG. 7. With a vortex generator shorter than 1.5 inches, the efficiency of liquid production dramatically decreased, indicating that a vortex flow could not develop in such a short vortex generator.

A phase-change vortex generator should be designed to maximize the production of liquids. The length of a vortex generator should be relatively short.

Referring now to FIG. 8, a cross-sectional view of a phase-changing vortex generator 90 is illustrated, which has one inlet 42 and one outlet 43. The outlet 43 may be an open end to the longitudinal chamber. Condensible vapor enters the vortex generator at inlet 42 at one end, and both condensed liquid and the remaining vapor exit through the other end. A nozzle 44 is used to guide the condensible vapor into the vortex generator tangentially at the inlet so that the vapor can form a vortex flow in the longitudinal chamber 40 of the vortex generator.

The design of the nozzle 44 is shown in FIG. 9. A plurality of guide vanes 48 direct the tangential entry of the vapor into the longitudinal chamber 40 of the vortex generator.

Figure 9A:
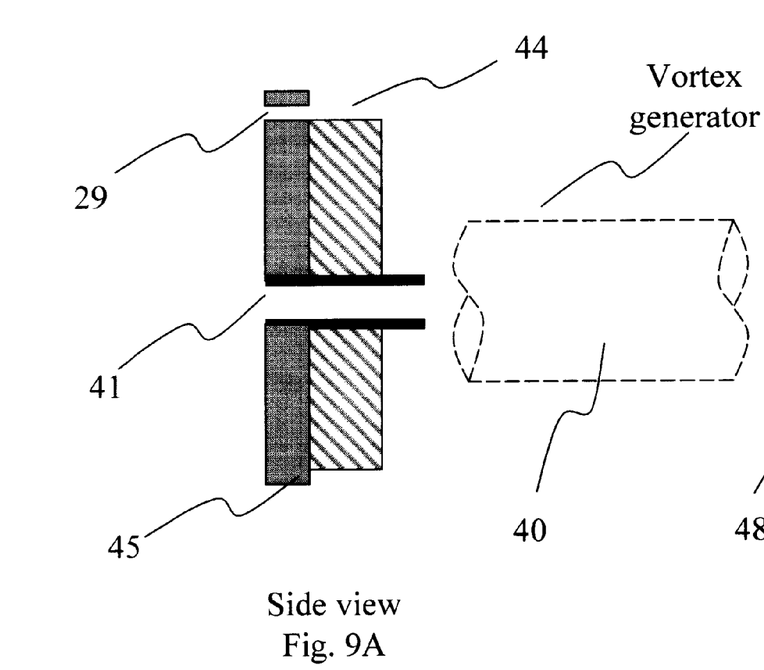
FIG. 9A is a side view and FIG. 9B is an end view, of a nozzle used in a subject vortex generator.
Figure 9B:
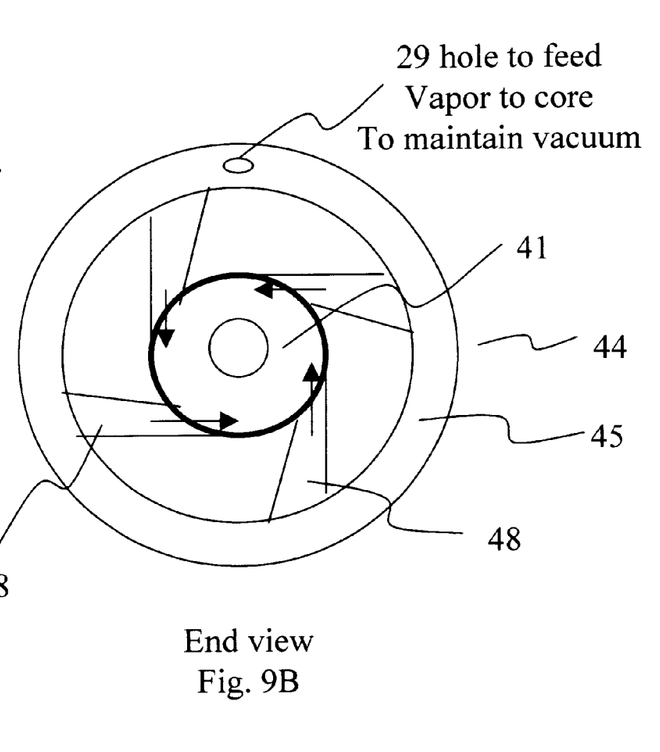

In another embodiment of the current invention, a small portion of the vapor (e.g., 5–25%) enters the core of the longitudinal chamber 40 of the vortex generator through a center feed 29, through a second chamber 47 and through channel 41, as illustrated in FIGS. 8, 9A and 9B. The center feed 29 is positioned on a circumferential rim 45 of the nozzle 44. The channel 41 is preferably located at the radial center of nozzle 44, and provides a means for second chamber 47 to communicate with the longitudinal chamber 40.

The center feed 29 directs a portion of the incoming vapor directly into the core of the longitudinal chamber 40 in order to maintain a sufficient vacuum strength inside the vortex generator. The size or diameter of the center feed 29 is determined by the desired percentage of vapor to be directed along the longitudinal axis of the vortex generator. Preferably, the center feed 29 should direct approximately 10% of the vapor to the core of the longitudinal chamber; however, the percentage may vary depending on the type of vapor used and the various dimensions of the vortex generator.

Figure 10:
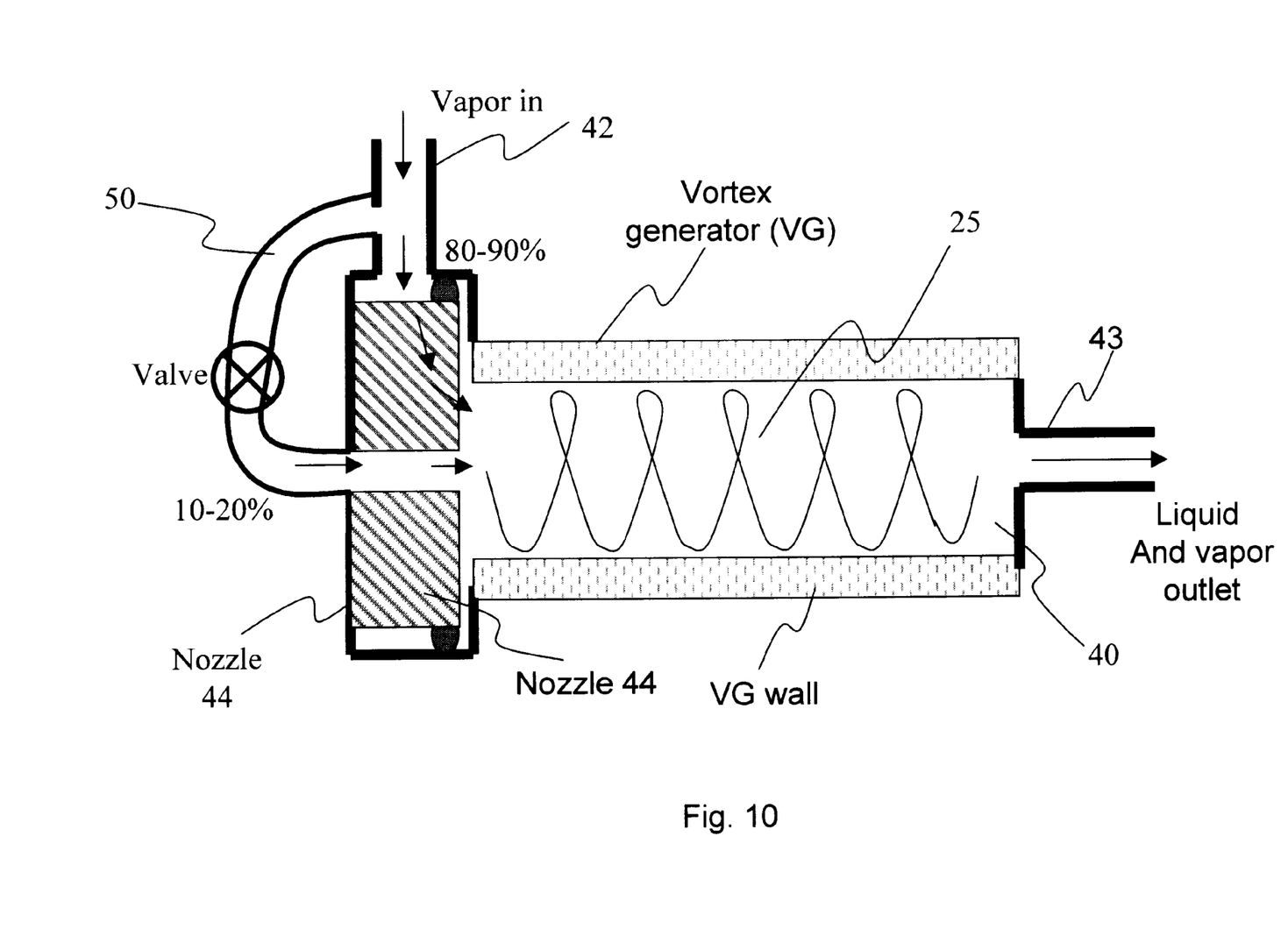
FIG. 10 is a cross-sectional view of an alternate embodiment of a vortex generator illustrated in FIG. 8 that utilizes a branch tube to divert a portion of the incoming vapor.

In an alternate embodiment illustrated in FIG. 10, a split inlet design is illustrated. A branch tube 50 is used to feed a fraction of the vapor into the core of the longitudinal chamber 40 of the vortex generator. The branch tube may feed the fraction of vapor into a secondary chamber similar to that illustrated in FIG. 8, or directly through the nozzle and into the core of the longitudinal chamber.

Figure 11:
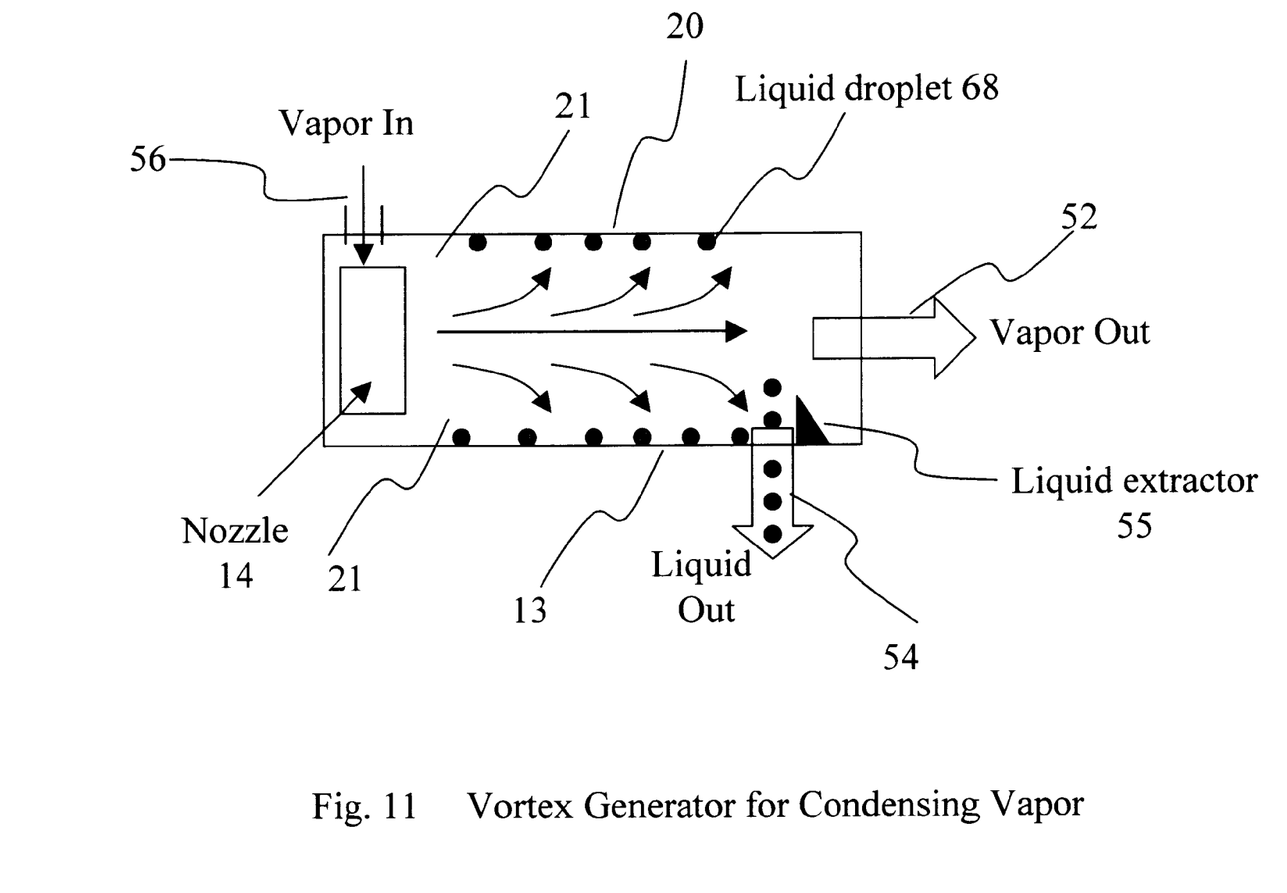
FIG. 11 is an alternate embodiment of a vortex generator in accordance with the present invention.

In another embodiment illustrated in FIG. 11, a vortex generator similar to that illustrated in FIG. 1 is disclosed; but that has one inlet 56 and two outlets 52, 54. First outlet 52 is positioned at the end opposite the inlet 56, as shown in FIG. 11. The second outlet 54 is positioned proximate the first outlet 52 but on the sidewall 13 of the longitudinal chamber 20. Relatively hot vapor exits through the first outlet 52, while relatively cool liquid exits through the second outlet 54.

The vortex generator disclosed in FIG. 11 utilizes a liquid extractor 55 to separate condensed liquid from vapor. The liquid extractor 55 is a projection (in the illustrated embodiment it is triangular or fin-shaped, but can be almost any shape, e.g., rectangular, circular, etc.) that protrudes slightly into the longitudinal chamber 20. Since the liquid droplets 68 move in a spiral path along the inner wall 21 of sidewall 13 of the vortex generator, such a liquid extractor 55 can collect almost all of the liquid droplets that are formed.

The vortex generator illustrated herein has been tested over a range of refrigerant flow rates between 0.01 and 0.022 kg/s. The dimensions of the vortex generator identified in this application are based primarily on this flow rate range. However, for higher flow rates, the vortex generator will have substantially larger dimensions.

Although this invention has been described and illustrated by reference to specific embodiments, it will be apparent to those skilled in the art that various changes and modifications may be made which clearly fall within the scope of this invention. For example, the present invention can be utilized with all condensible vapors, including steam, R-12, R-22, R-113 , R-134a, R410a, ammonia, carbon dioxide, natural gas, etc. The present invention is intended to be protected broadly within the spirit and scope of the appended claims.

We claim:

1. An apparatus for separating a stream of condensible vapor under relatively high pressure into a higher temperature vapor component and a lower temperature liquid component, the apparatus comprising:

a) a body having a first end and a second end spaced apart along a longitudinal axis, said body having an inlet at the first end for allowing the high-pressure vapor to enter, and an open second end that is used as an outlet for allowing a relatively hot vapor stream to exit and for allowing condensed liquid to exit, said outlet in communication with said inlet via a longitudinal chamber through said body; and b) a means for forcing the high-pressure vapor into a vortex-shaped vapor stream generally along the longitudinal axis of the body.

2. The apparatus of claim 1, further comprising means for feeding a pre-determined percentage of said high-pressure vapor into the general center of said vortex-shaped vapor stream, thereby prompting a cascade effect as evidenced by a sudden decrease in volume promoting the conversion of the vortex-shaped vapor into a liquid.

3. The apparatus of claim 2 wherein the means for forcing the high pressure vapor into a vortex comprises a nozzle located proximate the inlet, said nozzle being substantially cylindrical in shape and fixed in a stationary position relative to said body, said nozzle having a plurality of equally-spaced tangential inlets along its perimeter that communicate with said longitudinal chamber of the body so that, as the high-pressure vapor engages the nozzle, said tangential inlets inject the vapor into the longitudinal chamber of the body as a high-speed vortex vapor stream proximate the longitudinal axis.

4. The apparatus of claim 3 wherein the means for feeding comprises:

a) a rim that surrounds the periphery of said nozzle and defines a second chamber proximate said rim that is separated from said longitudinal chamber;

b) a passageway substantially through the center of the nozzle that connects said second chamber with said longitudinal chamber; and c) a feed inlet positioned on said rim for allowing at least a portion of said high pressure vapor to bypass said tangential inlets and for allowing said at least a portion be directed into the passageway of said nozzle and ultimately into said longitudinal chamber of said body.

5. The apparatus of claim 2 wherein the means for feeding comprises a branch tubing that shunts at least a portion of said high pressure vapor away from said forcing means and directly or indirectly into said longitudinal chamber of said body.

6. The apparatus of claim 2 further comprising a valve in communication with the inlet for controlling the pressure of the high-pressure vapor allowed to enter the apparatus.

7. The apparatus of claim 2 wherein said body is generally tubular in shape.

8. The apparatus of claim 7 wherein said tubular body is approximately 1½ inches in length and has an approximately ⅜ inch diameter opening.

9. The apparatus of claim 7 wherein said condensible vapor is a refrigerant.

10. The apparatus of claim 7 wherein said condensible vapor is water vapor.

11. An apparatus for separating a stream of condensible vapor under relatively high pressure into a higher temperature vapor component and a lower temperature liquid component, the apparatus comprising:

a) a body having a first end and a second end spaced apart along a longitudinal axis, said body having an inlet at the first end for allowing the high-pressure vapor to enter, a first outlet proximate the second end for allowing a relatively hot vapor stream to exit the apparatus and a second outlet for allowing condensed liquid to exit the apparatus located in the sidewall of the body closer to said second end then said first end;

b) a means for forcing the high-pressure vapor into a vortex-shaped vapor stream generally along the longitudinal axis of the body; and c) a fin located on the inner sidewall next to said second outlet and positioned between said second outlet and said second end of the body, said fin projecting at least partially into said vortex-shaped vapor stream for collecting condensed liquid in said vortex-shaped vapor stream and directing it to exit the apparatus through said second outlet.

12. The apparatus of claim 11 further comprising means for feeding a pre-determined percentage of said high-pressure vapor generally along the longitudinal axis of the body, thereby prompting a cascade effect as evidenced by a sudden decrease in volume promoting the conversion of vortex-shaped vapor to a liquid.

13. The apparatus of claim 12 wherein said condensible vapor is ammonia.

14. The apparatus of claim 12 wherein said condensible vapor is natural gas.

15. The apparatus of claim 12 wherein said condensible vapor is a refrigerant.

16. The apparatus of claim 15 wherein said refrigerant is R-134a.

17. A method comprising the steps of separating a condensible vapor under high pressure into a higher temperature vapor component and a lower temperature liquid component, comprising the steps of:

a) converting the high pressure condensible vapor into a cyclonic stream within a chamber, the cyclonic stream forming a vacuum at its core; and b) feeding at least a portion of said high pressure vapor to the vacuum core to sustain a continuous vapor-liquid conversion cascade.

* * * * *